US012577068B2

(12) United States Patent
Wanibe

(10) Patent No.: US 12,577,068 B2
(45) Date of Patent: Mar. 17, 2026

(54) SHEET FEEDING DEVICE AND IMAGE FORMING APPARATUS

(71) Applicant: SEIKO EPSON CORPORATION, Tokyo (JP)

(72) Inventor: Akihisa Wanibe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 159 days.

(21) Appl. No.: 18/466,035

(22) Filed: Sep. 13, 2023

(65) Prior Publication Data

US 2024/0092594 A1 Mar. 21, 2024

(30) Foreign Application Priority Data

Sep. 16, 2022 (JP) ................................ 2022-147688

(51) Int. Cl.
*B65H 1/26* (2006.01)
*G03G 15/00* (2006.01)

(52) U.S. Cl.
CPC ......... *B65H 1/266* (2013.01); *G03G 15/6502* (2013.01); *B65H 2402/32* (2013.01); *B65H 2402/60* (2013.01); *B65H 2405/31* (2013.01); *B65H 2405/32* (2013.01)

(58) Field of Classification Search
CPC ...... B65H 1/26; B65H 1/266; B65H 2402/32; B65H 2402/60; B65H 2405/31; B65H 2405/32; B65H 2405/332; B65H 2405/3521; A47B 88/437; A47B 2210/0037; A47B 2220/0036
See application file for complete search history.

(56) References Cited

U.S. PATENT DOCUMENTS

| | | | | |
|---|---|---|---|---|
| 6,161,681 A * | 12/2000 | Kalm | B65G 39/12 198/790 |
| 2009/0166956 A1* | 7/2009 | Kajiyama | B65H 1/266 271/164 |
| 2011/0318079 A1* | 12/2011 | Sakamoto | B65H 1/266 271/145 |
| 2014/0191645 A1* | 7/2014 | Kuba | A47B 88/487 312/334.12 |
| 2019/0077619 A1* | 3/2019 | Umezawa | G03G 15/6502 |

FOREIGN PATENT DOCUMENTS

JP 2009-155082 A 7/2009

* cited by examiner

*Primary Examiner* — Prasad V Gokhale
(74) *Attorney, Agent, or Firm* — WORKMAN NYDEGGER

(57) ABSTRACT

A paper feed device includes a paper-feed cassette configured to be removably inserted to a cassette accommodation unit, a rail member provided at an inner wall of the cassette accommodation unit, an engaging portion to engage with the rail member so as to be able to move, a rotating member configured to be brought into contact with an engagement surface of the engaging portion and be able to rotate in association with insertion and removal of the paper-feed cassette, a shaft member configured to pivotally support the rotating member and have one end fixed to the rail member or an inner wall of the cassette accommodation unit, and a supporting member configured to support another end of the shaft member. The supporting member is shaped so as to be able to change an attachment posture relative to the rail member or the inner wall.

10 Claims, 15 Drawing Sheets

SHEET FEEDING DEVICE AND IMAGE FORMING APPARATUS

The present application is based on, and claims priority from JP Application Serial Number 2022-147688, filed on Sep. 16, 2022, the disclosure of which is hereby incorporated by reference herein in its entirety.

BACKGROUND

1. Technical Field

The present disclosure relates to a paper feed device and an image forming device.

2. Related Art

Typically, as described in JP-A-2009-155082, there is known a paper feed device including a paper feed tray configured to accommodate recording paper, and a guiding portion provided within the main body of an image forming device and configured to support the paper feed tray such that the tray can be inserted and drawn. The guiding portion includes a guide rail and a rotating member. The rotating member is pivotally supported by a pivotally supporting portion fixed to the guide rail.

However, in the paper feed device described above, the pivotally supporting portion configured to support the rotating member has a one-side supporting structure. Here, for example, when the paper feed tray is pulled out, a large load acts on the pivotally supporting portion due to the weight of the paper feed tray including the recording paper. Thus, the pivotally supporting portion needs to have a thicker and larger structure. This necessitates a further increase in the footprint of the pivotally supporting portion, and the size of the paper feed device increases, which is a problem.

SUMMARY

A paper feed device includes a paper-feed cassette configured to be removably inserted to a cassette accommodation unit, a rail member provided at an inner wall of the cassette accommodation unit, an engaging portion provided at the paper-feed cassette and configured to movably engage with the rail member, a rotating member configured to be brought into contact with an engagement surface of the engaging portion and rotate in association with insertion and removal of the paper-feed cassette, a shaft member configured to pivotally support the rotating member and have one end fixed to the rail member or an inner wall of the cassette accommodation unit, and a supporting member configured to support another end of the shaft member to make the shaft member have a both-side supporting structure, in which the supporting member is shaped so as to change an attachment posture relative to the rail member or the inner wall of the cassette accommodation unit.

An image forming device includes the paper feed device described above, and an image forming unit configured to form an image on a sheet transported from the paper feed device.

An image forming device includes a paper-feed cassette configured to be removably inserted to a cassette accommodation unit, a rail member provided at an inner wall of the cassette accommodation unit, an engaging portion provided at the paper-feed cassette and configured to movably engage with the rail member, a rotating member configured to be brought into contact with an engagement surface of the engaging portion and rotate in association with insertion and removal of the paper-feed cassette, a shaft member configured to pivotally support the rotating member and have one end fixed to the rail member or an inner wall of the cassette accommodation unit, a supporting member configured to support another end of the shaft member to make the shaft member have a both-side supporting structure, and an image forming unit configured to form an image on a sheet transported from the paper-feed cassette, in which the paper-feed cassette includes a first paper-feed cassette and a second paper-feed cassette, the supporting member includes a first supporting member and a second supporting member having a shape equal to the first supporting member, the first supporting member is attached, in a first posture, to a corresponding first shaft member, and the second supporting member is attached in a second posture rotated relative to the first posture with a corresponding second shaft member being a center thereof.

DESCRIPTION OF EMBODIMENTS

First, the configuration of an image forming device 1 will be described.

Note that the X-Y-Z coordinate system illustrated in each of the drawings is a rectangular coordinate system. The direction along the X-axis is a device width direction of the image forming device 1. The direction along the Y-axis is a device depth direction. The direction along the Z-axis is a device height direction.

Figure 1A:
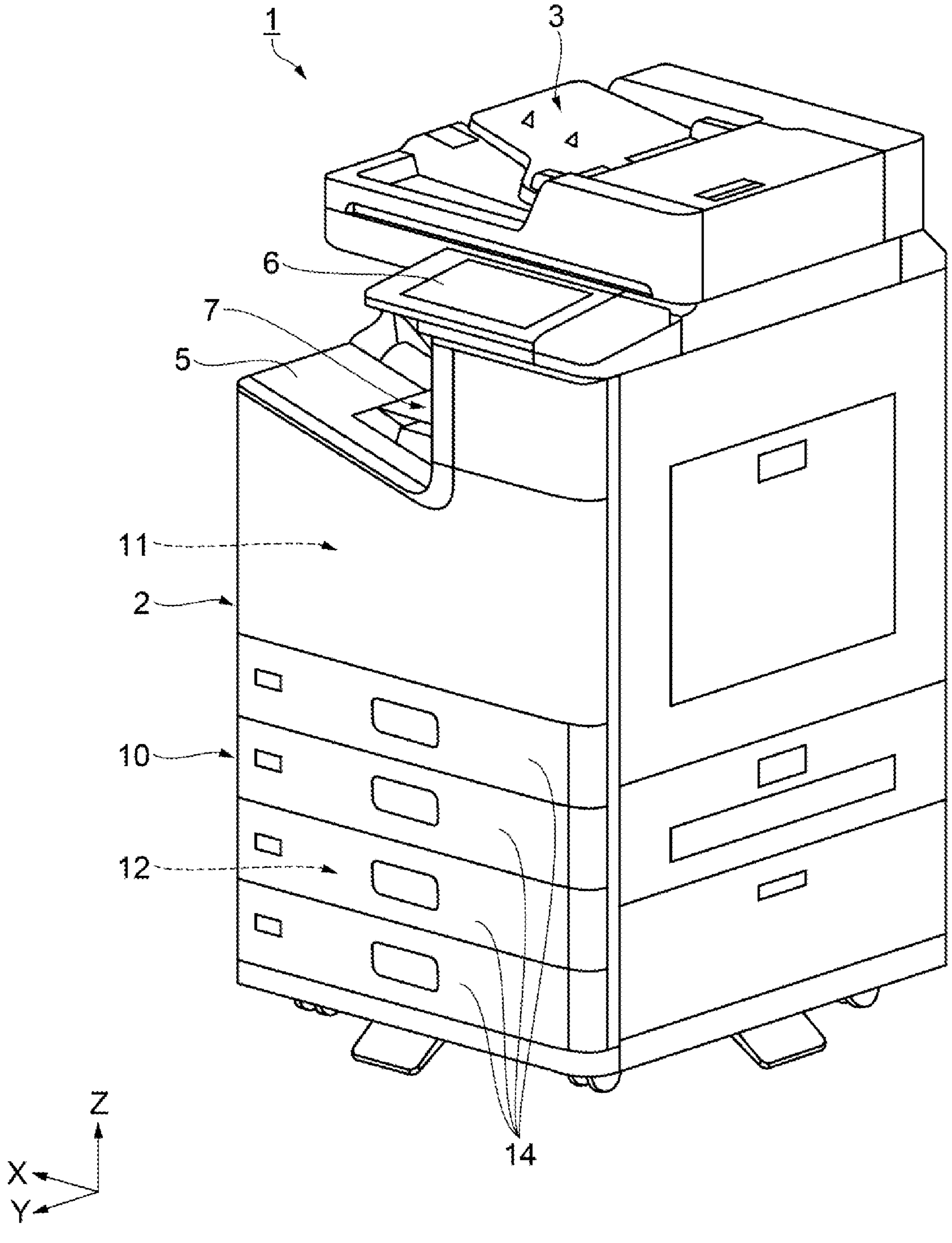
FIG. 1A is a perspective view illustrating the configuration of an external appearance of an image forming device.
Figure 1B:
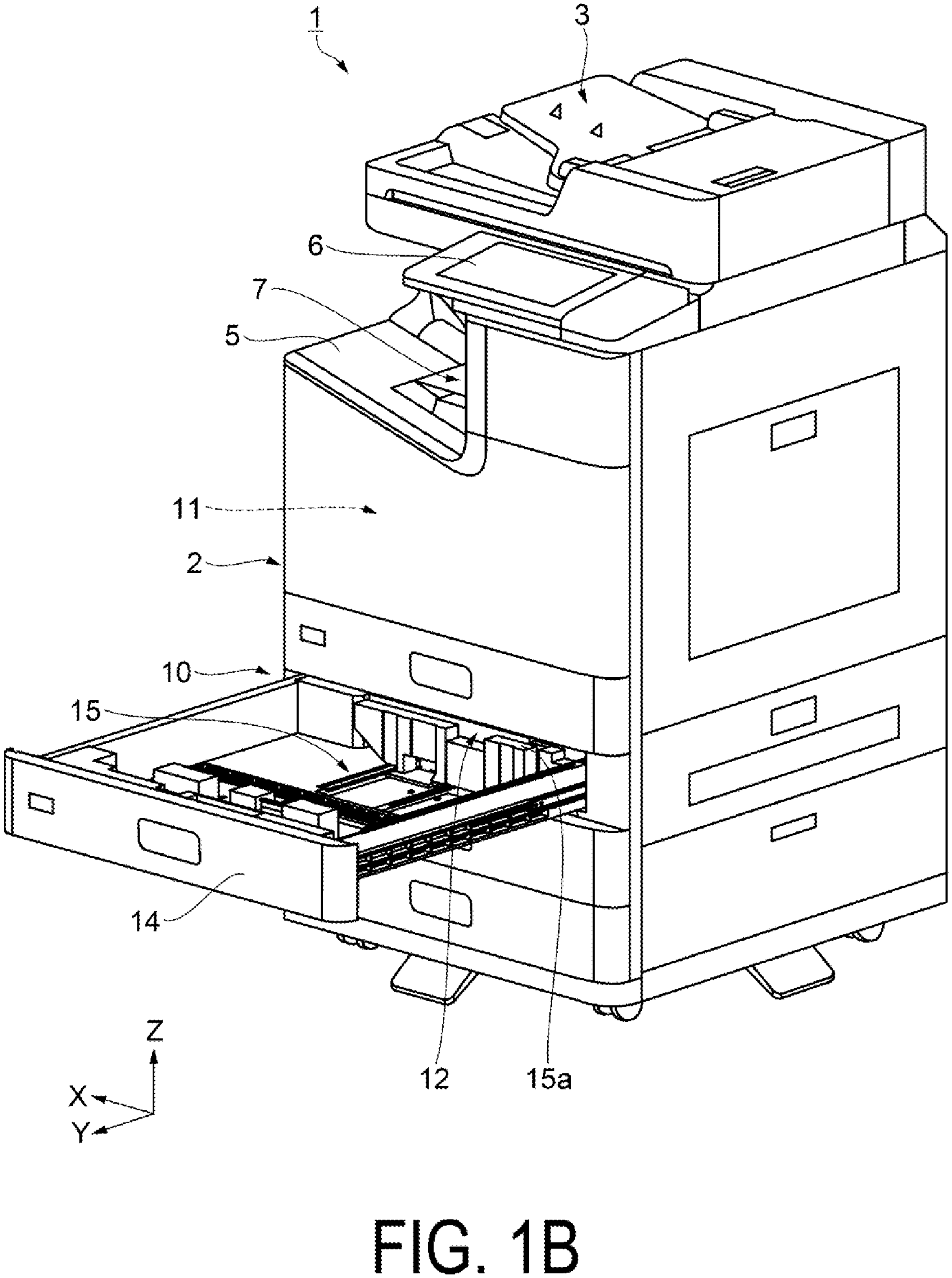
FIG. 1B is a perspective view illustrating the configuration of an external appearance (in a state where a paper-feed cassette is pulled out) of the image forming device.

As illustrated in FIGS. 1A and 1B, the image forming device 1 according to the present embodiment is configured as a multifunction device including a device body 2 and a scanner unit 3.

The device body 2 includes a paper feed device 10 and an image forming unit 11. The paper feed device 10 includes a cassette accommodation unit 12 including an accommodation space. A paper-feed cassette 14 configured to accommodate a sheet P (FIG. 2) serving as a medium is accommodated in the cassette accommodation unit 12. The paper-feed cassette 14 includes a sheet accommodation unit 15 formed in a concave shape, and the sheet P is accommodated in this sheet accommodation unit 15. The paper-feed cassette 14 is inserted removably from the front face side (the side of +Y direction) of the cassette accommodation unit 12. The image forming device 1 according to the present embodiment includes a plurality of (for example, four) paper-feed cassettes 14. The sheet P includes, for example, ordinary paper, thick paper, photo sheet, or the like.

The scanner unit 3 is disposed at an end portion, in the +Z direction, of the device body 2. A discharge portion 7 and a sheet mounting portion 5 are provided between the scanner unit 3 and the paper feed device 10 in the device height direction of the device body 2. The discharge portion 7 is configured to discharge the sheet P on which recording has been performed by the image forming unit 11. The sheet P discharged from the discharge portion 7 is mounted on the sheet mounting portion 5. In addition, an operation unit 6 is provided at the front face side of the device body 2. The operation unit 6 is provided with a display unit such as a liquid crystal panel. By operating the operation unit 6, it is possible to input an instruction to the image forming device 1 to perform a recording operation and an image reading operation.

Figure 2:
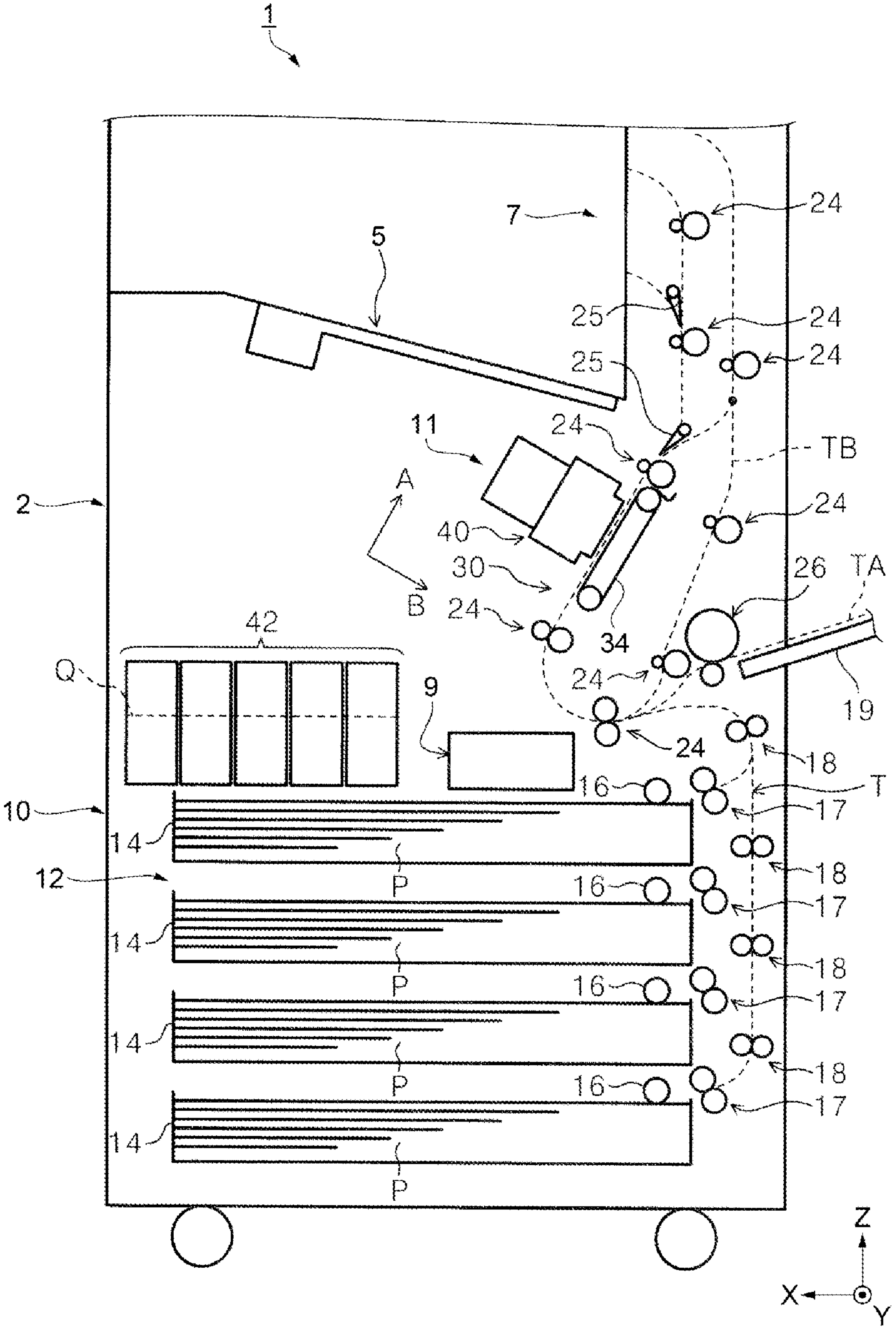
FIG. 2 is a schematic view illustrating the configuration of the inside of the image forming device.

As illustrated in FIG. 2, in the image forming device 1, the sheet P passes through a transport path T illustrated as the dashed line, and is transported. Note that the transport direction in which the sheet P is transported is a direction along the transport path T, and hence, the transport direction changes from portion to portion in the transport path T.

A transport unit 30, an ink tank 42, an image forming unit 11, a controlling unit 9, and the like are provided in the device body 2. In addition, a cleaning unit (not illustrated in the drawing) configured to clean the transport unit 30 and the like are provided in the device body 2. Furthermore, the image forming device 1 includes a manual feed tray 19 and a separation roller pair 26. The image forming unit 11 includes a recording head 40.

The sheet P accommodated in the paper-feed cassette 14 is transported along the transport path T by a pick roller 16 and transport roller pairs 17 and 18. The transport unit 30, a plurality of transport roller pairs 24 configured to transport the sheet P, a plurality of flaps 25 configured to switch paths through which the sheet P is transported are provided at the transport path T.

A manual feed path TA and an inverting path TB merge with the transport path T. The manual feed path TA extends from the manual feed tray 19 through the separation roller pair 26 to the transport path T. The inverting path TB is a path bifurcating from the transport path T heading toward the discharge portion 7, and is a path configured to switch back the sheet P and also feed the sheet P to the transport path T again.

The transport unit 30 and the recording head 40 are opposed to each other with the transport path T being interposed between them. The transport path T extends between the transport unit 30 and the recording head 40 and along an oblique direction heading toward a position at the −X direction and the +Z direction. Here, between the transport unit 30 and the recording head 40, the direction in which the transport path T extends downstream is set as the +A direction. In addition, as viewed from the Y direction, the direction perpendicular to the +A direction and in which ink Q is discharged from the recording head 40 is set as the +B direction.

The transport unit 30 includes a transporting belt 34 configured to be able to hold the sheet P with electrical charge, and the sheet P is transported by driving the transporting belt 34.

The recording head 40 includes a nozzle section (not illustrated in the drawing) configured to discharge the ink Q. The recording head 40 is supplied with the ink Q from the ink tank 42. The recording head 40 discharges the ink Q onto the sheet P transported by the transport unit 30, thereby forming an image. The sheet P on which an image has been formed is transported by the transport roller pair 24, and is ejected from the discharge portion 7. The sheet P ejected from the discharge portion 7 is mounted at the sheet mounting portion 5.

Next, the detailed configuration of the paper feed device 10 will be described.

Figure 3A:
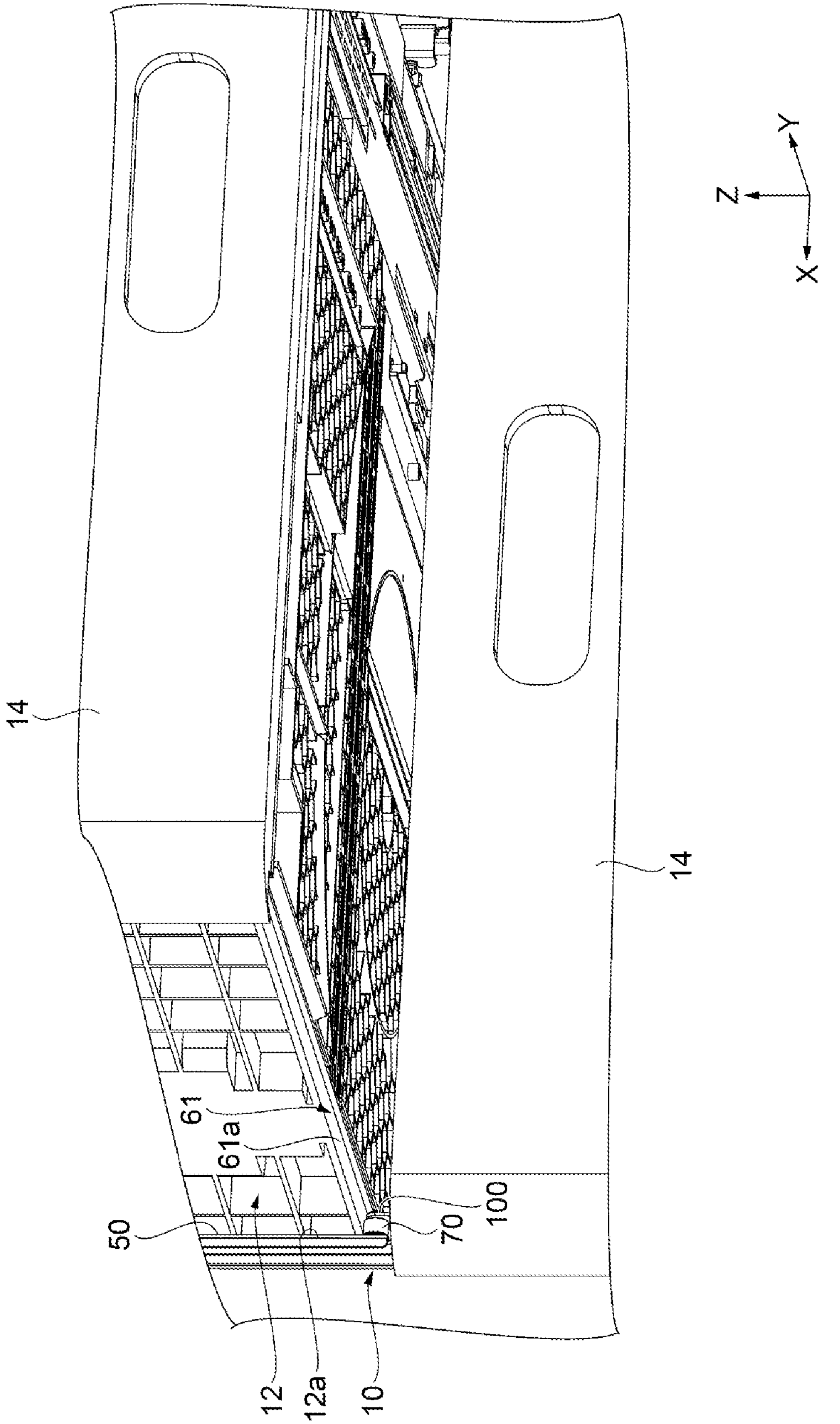
FIG. 3A is a perspective view illustrating the configuration of a paper feed device.
Figure 3B:
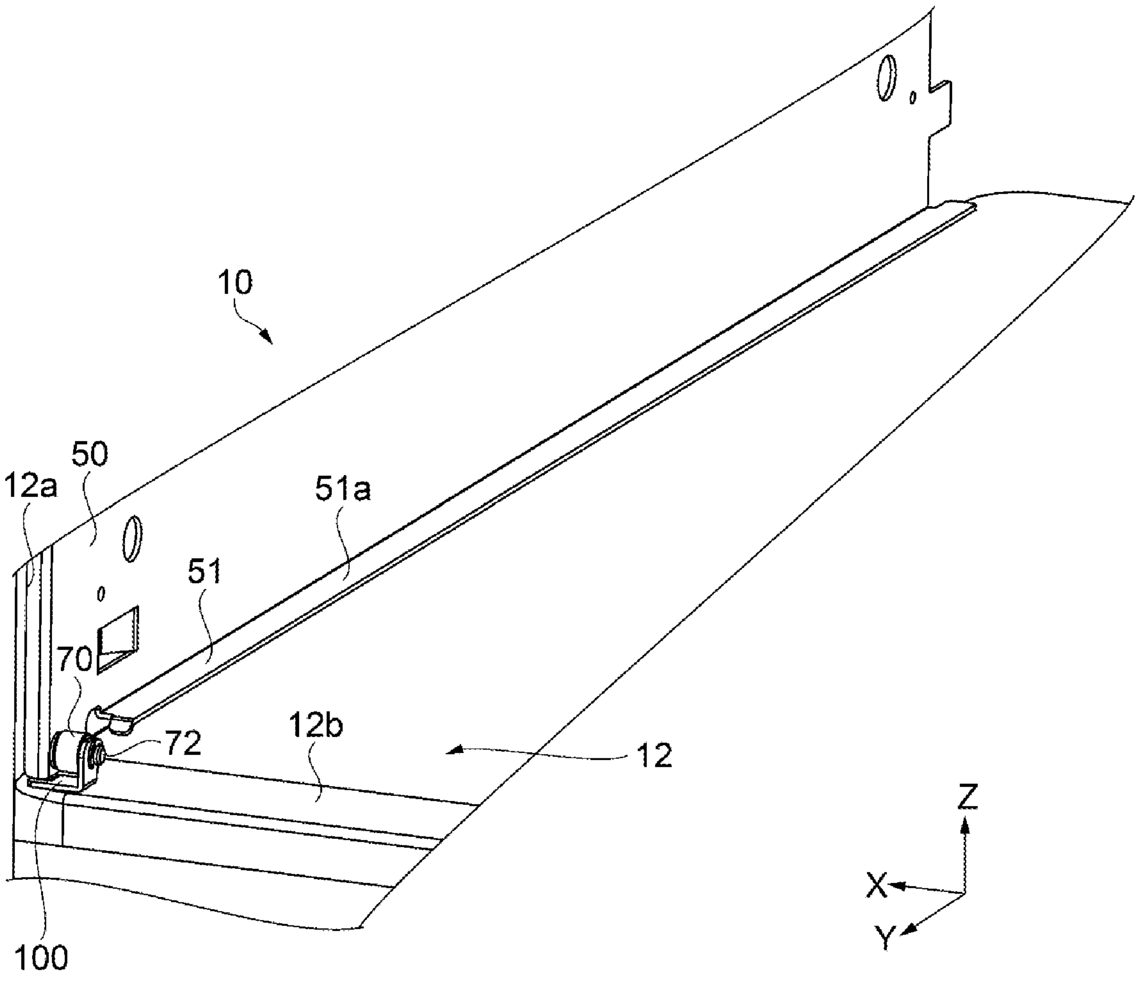
FIG. 3B is a perspective view illustrating the configuration of the paper feed device.

As illustrated in FIGS. 3A and 3B, the paper feed device 10 includes: the paper-feed cassette 14 configured to be removably inserted to the cassette accommodation unit 12; a rail member 50 provided at an inner wall of the cassette accommodation unit 12; and an engaging portion 61 provided at the paper-feed cassette 14 and configured to engage with the rail member 50 in a movable manner.

The rail member 50 is disposed at an inner wall 12*a* formed at an end portion in the +X direction of the cassette accommodation unit 12 and at an end portion in the −X direction. The rail member 50 is a metal sheet. The rail member 50 includes a rail 51. The rail 51 is a plate member having a narrow width and extending along the Y-axis. An upper surface 51*a* at an end portion, in the +Z direction, of the rail 51 is a flat surface. The rail 51 according to the present embodiment is formed by bending a portion of the rail member 50.

The engaging portion 61 of the paper-feed cassette 14 includes an engagement surface 61*a* (FIG. 3A) at an end portion, in the +X direction, of the paper-feed cassette 14 and at an end portion in the −X direction. The engagement surface 61*a* is provided, for example, at an end surface, in the −Z direction, of the paper-feed cassette 14. The engagement surface 61*a* extends along the Y-axis. The engagement surface 61*a* is a flat surface.

In addition, the upper surface 51*a* of the rail member 50 and the engagement surface 61*a* of the paper-feed cassette 14 are disposed so as to be opposed to each other. This enables the paper-feed cassette 14 to move along the rail member 50. Furthermore, a roller 62 (FIG. 4A) is provided at an end portion, in the −Y direction, of the engaging portion 61 (engagement surface 61*a*). The roller 62 rotates with the center thereof being the shaft provided along the X-axis. When the paper-feed cassette 14 is moved relative to the rail member 50, the roller 62 is brought into contact with the rail 51, and rotates. This makes it possible to smoothly perform an insertion and removal operation of the paper-feed cassette 14.

In addition, the paper feed device 10 includes a rotating member 70 configured to be brought into contact with the engagement surface 61*a* of the paper-feed cassette 14 and be able to rotate in association with insertion and removal of the paper-feed cassette 14. The rotating member 70 is, for example, a roller. The rotating member 70 has a cylindrical shape. The rotating member 70 is disposed adjacent to the inner wall (rail member 50 in the present embodiment) of the cassette accommodation unit 12.

The rotating member 70 is pivotally supported by the shaft member 72. The shaft member 72 has one end fixed to the rail member 50 or the inner wall 12*a* of the cassette accommodation unit 12. The shaft member 72 according to the present embodiment is fixed to the rail member 50 through a fixing method such as caulking. The shaft member 72 has a cylindrical shape. The shaft member 72 fixed to the rail member 50 extends along the X-axis.

The position of the end portion, in the +Z direction, of the rotating member 70 is significantly higher than the position of the upper surface 51*a* of the rail 51. This makes it easy to bring the engagement surface 61*a* of the paper-feed cassette 14 into contact with the rotating member 70 when the paper-feed cassette 14 is inserted or removed. In addition, the insertion and removal operation of the paper-feed cassette 14 into and from the cassette accommodation unit 12 becomes smooth with the rotation of the rotating member 70.

Note that the rotating member 70 and the shaft member 72 have an integral structure.

The rotating member 70 according to the present embodiment is disposed at an end portion, in the +Y direction, of the cassette accommodation unit 12. This makes it possible to increase the maximum pull-out amount of the paper-feed cassette 14 relative to the cassette accommodation unit 12.

Figure 4A:
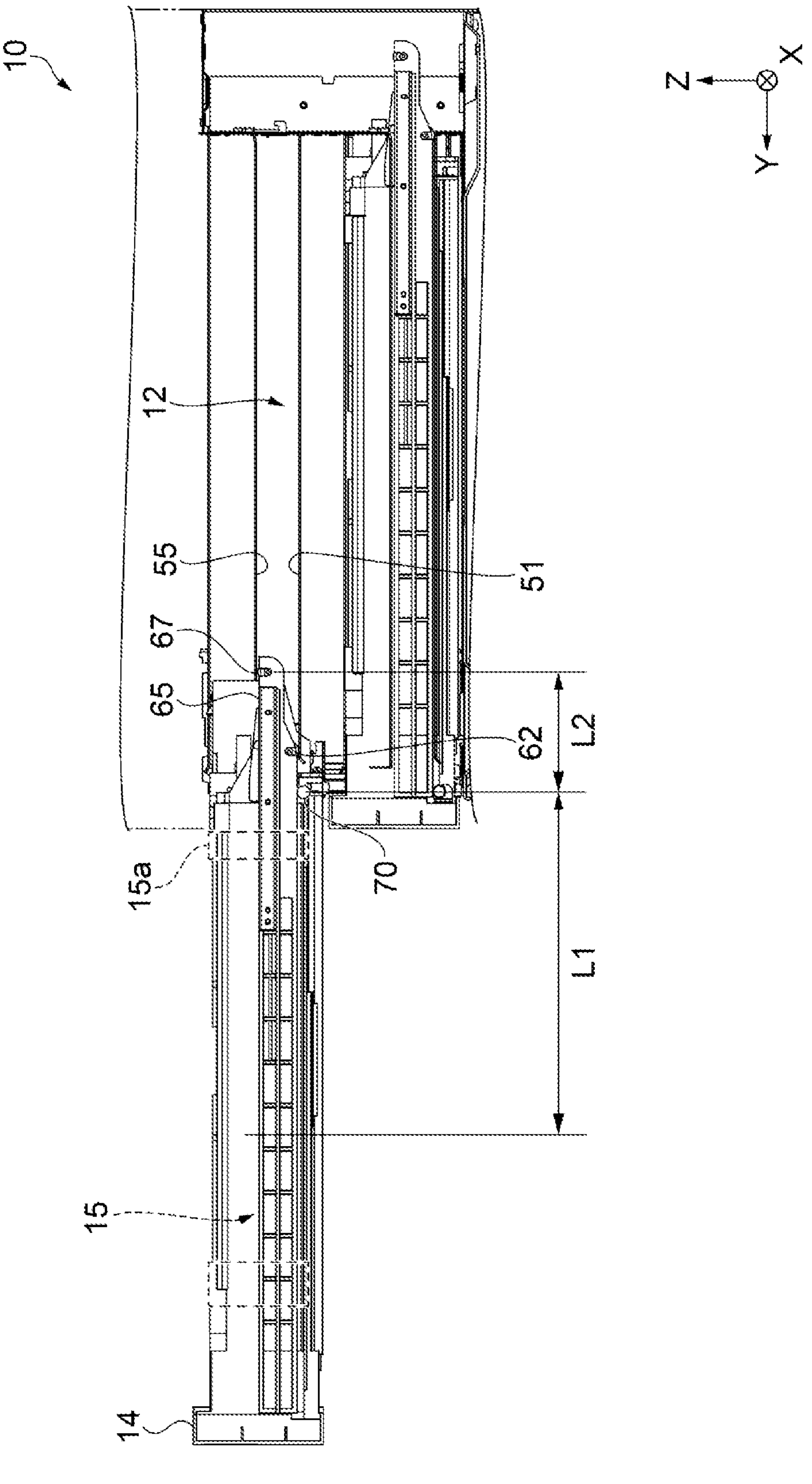
FIG. 4A is a diagram illustrating a state where a paper-feed cassette is pulled out from a cassette accommodation unit.

Specifically, as illustrated in FIG. 4A, in the paper feed device 10, when the paper-feed cassette 14 is fully pulled out from the cassette accommodation unit 12, a sheet-end restricting unit 15*a* provided at the sheet accommodation unit 15 and configured to restrict the end surface, in the −Y direction, of the sheet P accommodated is configured so as to be able to be visually recognized in plan view of the sheet accommodation unit 15. That is, the maximum pull-out amount of the paper-feed cassette 14 according to the present embodiment is set so as to increase the ratio of the length dimension by which the paper-feed cassette 14 can be pulled out, relative to the entire length of the paper-feed cassette 14 in a direction along the Y-axis. The maximum pull-out amount (ratio) of the paper-feed cassette 14 according to the present embodiment falls in a range of approximately 70% to 80% of the entire length of the paper-feed cassette 14 in a direction along the Y-axis.

Note that, when the ratio of the length dimension by which the paper-feed cassette 14 can be pulled out is small, there is a possibility that the sheet-end restricting unit 15*a* is in a state of being hidden behind the cassette accommodation unit 12 when the paper-feed cassette 14 is pulled out. In this case, at the time of accommodating the sheet P at the sheet accommodation unit 15, the end portion of the sheet P needs to be caused to get into the cassette accommodation unit 12, which deteriorates the convenience for a user. In contrast, in the case of the present embodiment, when the paper-feed cassette 14 is pulled out, the sheet-end restricting unit 15*a* is exposed to the outside of the cassette accommodation unit 12. This makes it possible to easily put the sheet P into the sheet accommodation unit 15.

Figure 4B:
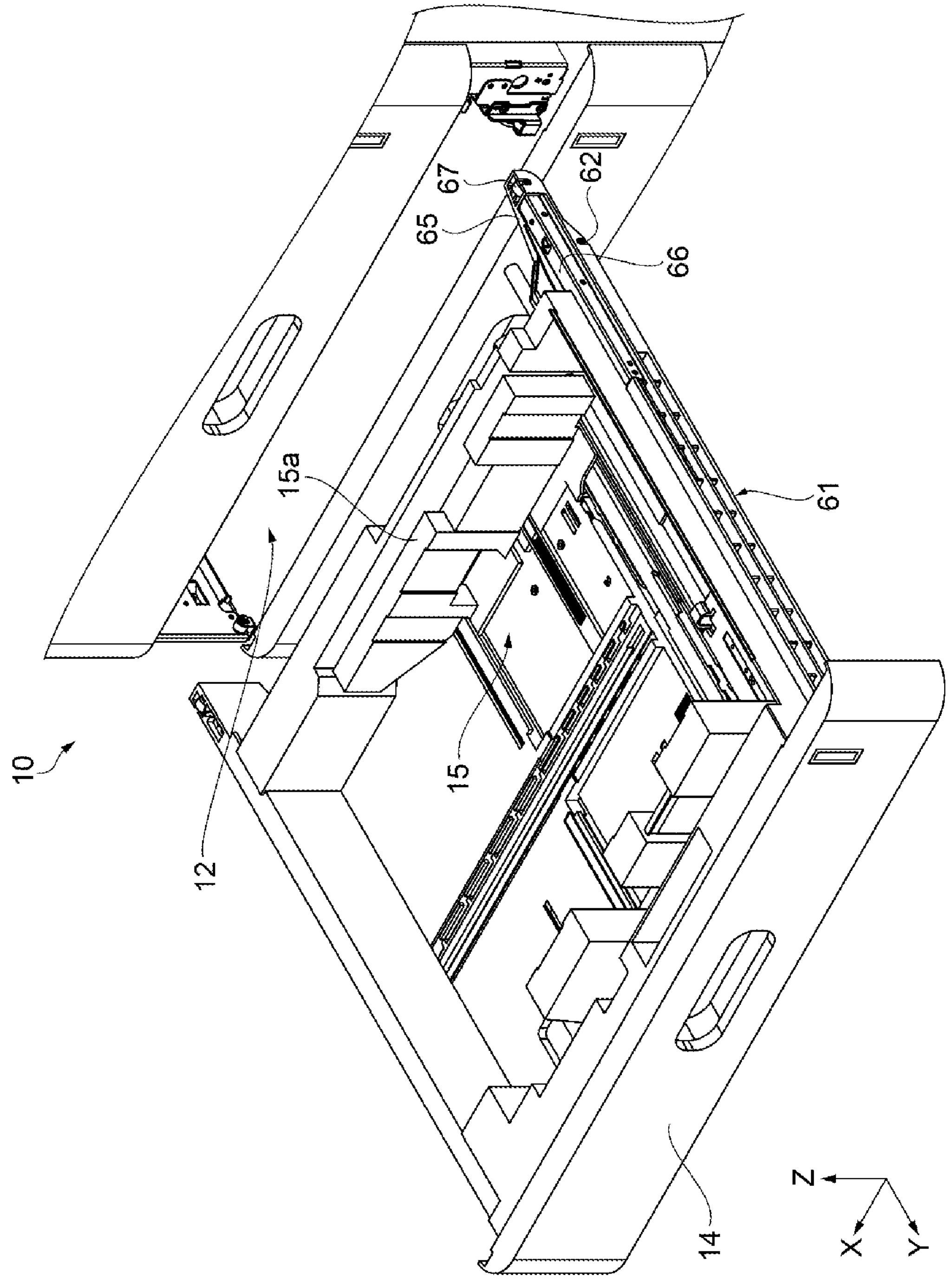
FIG. 4B is a perspective view illustrating the configuration of the paper-feed cassette.

An arm portion 65 protruding toward the −Y direction is provided at an end portion, in the −Y direction in a pullingout direction (direction along the Y-axis), of the paper-feed cassette 14 (FIG. 4B). This arm portion 65 is disposed at the −Y direction of the engaging portion 61. The arm portion 65 and the engaging portion 61 are formed integrally. The arm portion 65 is used to prevent the paper-feed cassette 14 from rotating or dropping when the paper-feed cassette 14 is fully pulled out from the cassette accommodation unit 12. Specifically, when the paper-feed cassette 14 is fully pulled out from the cassette accommodation unit 12, the end portion side, in the +Y direction, of the paper-feed cassette 14 is displaced downward due to the principle of leverage with the rotating member 70 being the fulcrum. On the other hand, the end portion side (arm portion 65), in the −Y direction, of the paper-feed cassette 14 is displaced upward. The arm portion 65 displaced upward is brought into contact with a restricting surface 55 disposed above the rail 51. This makes it possible to prevent the paper-feed cassette 14 from rotating or dropping relative to the cassette accommodation unit 12. Note that a roller 67 is provided at an upper portion of the end portion, in the −Y direction, of the arm portion 65. This roller 67 rotates with the center being the shaft provided along the X-axis. In addition, the roller 67 is brought into contact with the restricting surface 55 when the paper-feed cassette 14 is fully pulled out from the cassette accommodation unit 12.

Here, it is desirable that the length direction of the arm portion 65 along the Y-axis should be reduced as much as possible. By reducing the length dimension of the arm portion 65, it is possible to reduce the accommodation space at the back side (end portion side in the −Y direction) of the cassette accommodation unit 12, as compared with a case where the length dimension of the arm portion 65 is long. This makes it possible to reduce the size of the paper feed device 10 and the image forming device 1.

In the present embodiment, the length dimension of the arm portion 65 along the Y-axis is configured to be short. Specifically, a length dimension L2 (approximate length dimension of the arm portion 65) is reduced to be approximately 30% of a length dimension L1, where the length dimension L1 is a length from the top portion of the rotating member 70 serving as the fulcrum to the center of gravity of the paper-feed cassette 14 in which the sheet P is accommodated, and the length dimension L2 is a length from the top portion of the rotating member 70 serving as the fulcrum to the roller 67 of the arm portion 65. This makes it possible to reduce the accommodation space of the cassette accommodation unit 12. In other words, it is possible to reduce the footprint of the paper-feed cassette 14 in the insertion and removal direction. Thus, it is possible to reduce the size of the paper feed device 10 and the image forming device 1.

Incidentally, when the paper-feed cassette 14 is fully pulled out from the cassette accommodation unit 12, a load acts on the arm portion 65. Thus, in order to reinforce the arm portion 65 and its surroundings, a reinforcing metal sheet 66 is provided over the arm portion 65 and a portion of the engaging portion 61 (FIG. 4B). As an example of the configuration of the reinforcing metal sheet 66, it is possible to dispose a metal sheet having a flat plate shape or a metal sheet having a bent portion. Note that, when the metal sheet having a bent portion is employed, the tolerance against breakage more improves from the viewpoint of increasing the stress rigidity.

In addition, when the paper-feed cassette 14 is fully pulled out from the cassette accommodation unit 12, the largest load also acts on the shaft member 72 through the rotating member 70. Thus, it is considered to employ a structure that makes the shaft member 72 thicker and larger or a structure that makes the rotating member 70 thicker and larger. However, when the structure of the shaft member 72 or the like increases, the footprint of the shaft member 72 needs to be further increased, which results in an increase in the size of the paper feed device 10.

In addition, it is also considered to employ a structure that deals with it by increasing the rigidity of the rail member 50 or the inner wall of the cassette accommodation unit 12 to which one end of the shaft member 72 is fixed. For example, it is considered to employ a structure or the like that achieves reinforcement by increasing the thickness of the metal sheet used for the rail member 50 or the inner wall of the cassette accommodation unit 12, or by adding the bent portion, or by adding a reinforcing member. Even when one of these structures is employed, the size of the paper feed device 10 increases.

Thus, the paper feed device 10 according to the present embodiment is structured such that the strength against the load of the shaft member 72 is secured, and the footprint of the shaft member 72 or the like is reduced. Below, a specific configuration will be described.

The paper feed device 10 according to the present embodiment includes a supporting member 100. One end of the shaft member 72 is fixed at the rail member 50, and the other end of the shaft member 72 is supported by the supporting member 100. This makes the shaft member 72 have a both-side supporting structure.

In addition, the supporting member 100 is attached at the cassette accommodation unit 12. The supporting member 100 is configured so as to be able to change the posture in which the member is attached to the cassette accommodation unit 12. As the attachment posture of the supporting member 100 changes, it is possible to change the location of the supporting member 100 that is brought into contact with the cassette accommodation unit 12.

Next, a specific configuration of the supporting member 100 will be described.

As illustrated in FIGS. 5A, 5B, 5C, and 5D, the supporting member 100 is configured such that one metal sheet is bent. The supporting member 100 has a letter-L shape in which the member is bent substantially at the right angle. The supporting member 100 has a first portion 101 at one side thereof and a second portion 102 at the other side with respect to the bent portion 110 at which the member is bent.

The first portion 101 includes a positioning portion 111. It is preferable that the positioning portion 111 is configured so as to have a shape that makes it possible to restrict the position in the axial direction with respect to the shaft member 72. The positioning portion 111 supports the other end of the shaft member 72. The positioning portion 111 according to the present embodiment is a through hole. Note that the positioning portion 111 may be a notch having a letter-U shape.

In addition, a protruding portion 112 is provided at a side surface of the second portion 102 that is opposed from the first portion 101 with the bent portion 110 being interposed between them. That is, the protruding portion 112 is formed at an end surface of the second portion 102 that is opposed from the bent portion 110. The protruding portion 112 is a portion of the metal sheet that constitutes the supporting member 100. The protruding portion 112 protrudes at the second portion 102 toward a direction away from the bent portion 110. The protruding portion 112 is used to prevent an error of the attachment posture (attachment direction) when the supporting member 100 is attached to the cassette accommodation unit 12.

Figure 5A:
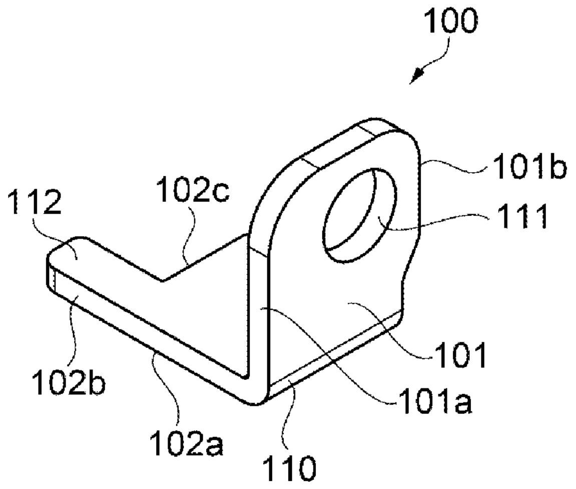
FIG. 5A is a perspective view illustrating the configuration of a supporting member.
Figure 5B:
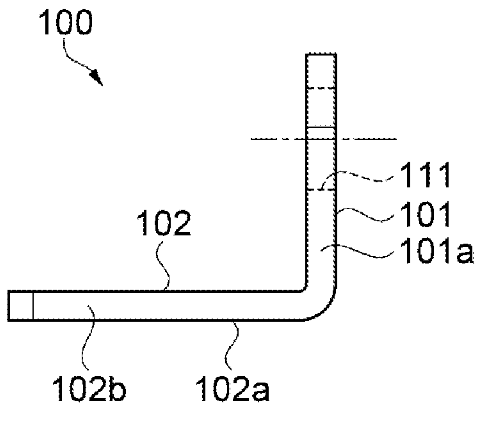
FIG. 5B is a front view illustrating the configuration of the supporting member.
Figure 5C:
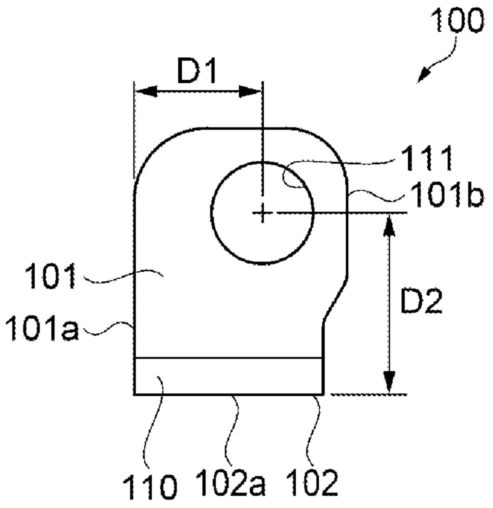
FIG. 5C is a side view illustrating the configuration of the supporting member.
Figure 5D:
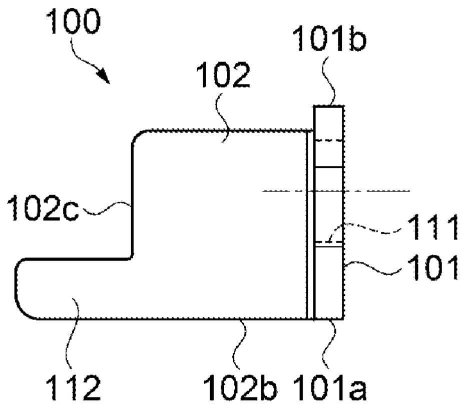
FIG. 5D is a plan view illustrating the configuration of the supporting member.

As illustrated in FIG. 5C, a length dimension D1 and a length dimension D2 differ from each other. The length dimension D1 is a dimension between the center point of the positioning portion 111 and a first surface 101*a* that is an end surface, at one side, of the first portion 101. The length dimension D2 is a dimension between the center point of the positioning portion 111 and a first surface 102*a* that is an end surface, at one side, of the second portion 102. In the present embodiment, the length dimension D2 is longer than the length dimension D1. Note that the first surface 101*a* of the first portion 101 is one side surface other than the surface where the positioning portion 111 of the first portion 101 is formed. The first surface 102*a* of the second portion 102 is in contact with the outer side portion of the bent portion 110, and is a surface parallel to a direction in which the positioning portion 111 penetrates.

The supporting member 100 is able to change into a first posture and a second posture in which attachment is made in a posture differing from the first posture. In addition, in the present embodiment, the first posture and the second posture differ in the height of attachment.

Below, description will be made of the first posture and the second posture of the supporting member 100.

First, description will be made of an example in which the supporting member 100 is attached in the first posture.

The first posture is configured such that the first surface 102*a* (flat surface) of the second portion 102 is a bottom surface portion of the supporting member 100, and receives the load of the paper-feed cassette 14 through a rotating member and a shaft member.

Figure 6A:
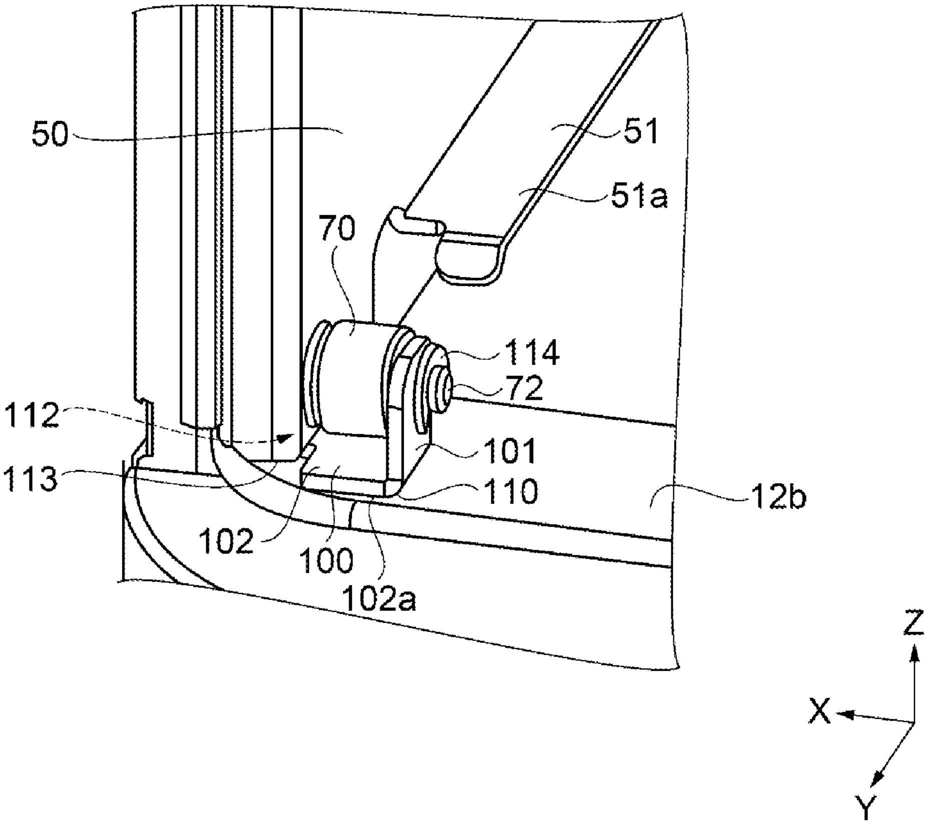
FIG. 6A is a perspective view illustrating an example in which the supporting member is attached in a first posture.
Figure 6B:
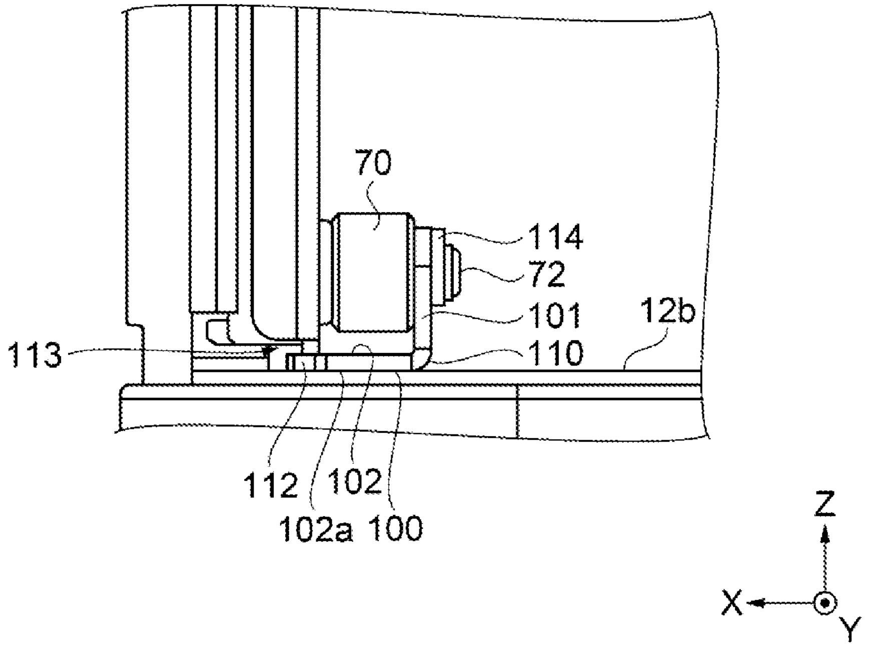
FIG. 6B is a front view illustrating an example in which the supporting member is attached in the first posture.

Specifically, as illustrated in FIGS. 6A and 6B, in the first posture, the first surface 102*a* of the second portion 102 of the supporting member 100 is a bottom surface portion of the supporting member 100, and is disposed on an inner wall 12*b* (bottom plate) of the cassette accommodation unit 12 that is along the X-axis. At this time, the first portion 101 is disposed at the −X direction of the supporting member 100. In addition, the first portion 101 is disposed along the Z-axis. Furthermore, the protruding portion 112 is inserted into a space 113 provided between the inner wall 12*b* and the rail member 50. This configuration makes it possible to prevent the supporting member 100 from being attached at a wrong location or being attached in a wrong posture. Furthermore, it is possible to prevent rotation at the time of attaching the supporting member 100. These make it possible to improve workability in attachment of the supporting member 100.

In addition, the supporting member 100 is positioned relative to the shaft member 72. Specifically, a attachable and detachable member 114 (for example, an E ring or a snap ring) is fitted at a tip portion of the shaft member 72 that protrudes from a through hole serving as the positioning portion 111. This makes it possible to prevent the supporting member 100 from being detached from the shaft member 72. Furthermore, by detaching the member 114, it is possible to remove the supporting member 100 or the rotating member 70, which makes it possible to easily perform maintenance or replacement of the supporting member 100 or the rotating member 70.

In this manner, a both-side supporting structure A configured to support both ends of the shaft member 72 is formed.

When the supporting member 100 is in the first posture and, for example, when the paper-feed cassette 14 is pulled out from the cassette accommodation unit 12, a load in the −Z direction acts from the top portion of the rotating member 70 through the shaft member 72. In this case, the first surface 102*a* of the second portion 102 of the supporting member 100 is brought into contact with the inner wall 12*b*, and stress is transferred. This alleviates the stress acting on the supporting member 100, and it is possible to secure the strength of supporting the shaft member 72. That is, when a load acts in the −Z direction on the shaft member 72, the supporting member 100 supports the shaft member 72, and at the same time, the second portion 102 (first surface 102*a*) disposed at the −Z direction of the shaft member 72 is supported by the inner wall 12*b*. This makes it possible to maintain the state of support of the shaft member 72. Furthermore, the shaft member 72 is supported in a stable state. Thus, rotational movement of the rotating member 70 is not blocked, and it is possible to smoothly pull out the paper-feed cassette 14.

Next, description will be made of an example in which the supporting member 100 is in the second posture.

The second posture can be used for a paper-feed cassette portion having different specifications, that is, the second posture can be used for a paper-feed cassette 14 disposed at a position differing from the paper-feed cassette 14 using the support portion 100 in the first posture. The supporting member 100 can be attached to an item other than the device itself. For example, the supporting member 100 can be applied to a derived and improved device, a paper feed device such as an additional cassette, and an image forming device.

The second posture is a posture obtained by rotating the supporting member 100 at a predetermined angle in a first direction relative to the first posture described above, and is configured such that the first surface 101*a* (side surface) of the first portion 101 and the second surface 102*b* (side surface) of the second portion 102 serve as a bottom surface portion of the supporting member 100, and receive the load. The second posture according to the present embodiment is a posture obtained by rotating the supporting member 100 in the first posture by 90° in a direction opposite from the clockwise direction as viewed toward the +X direction.

Figure 7A:
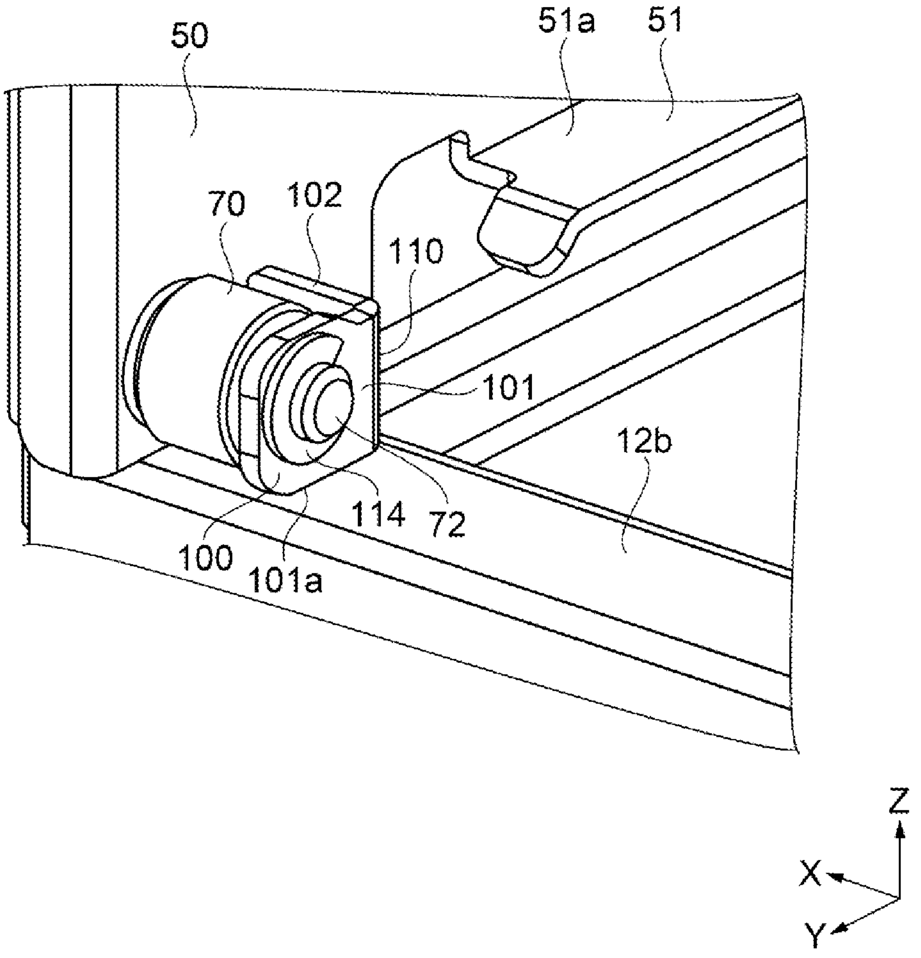
FIG. 7A is a perspective view illustrating an example in which the supporting member is attached in a second posture.
Figure 7B:
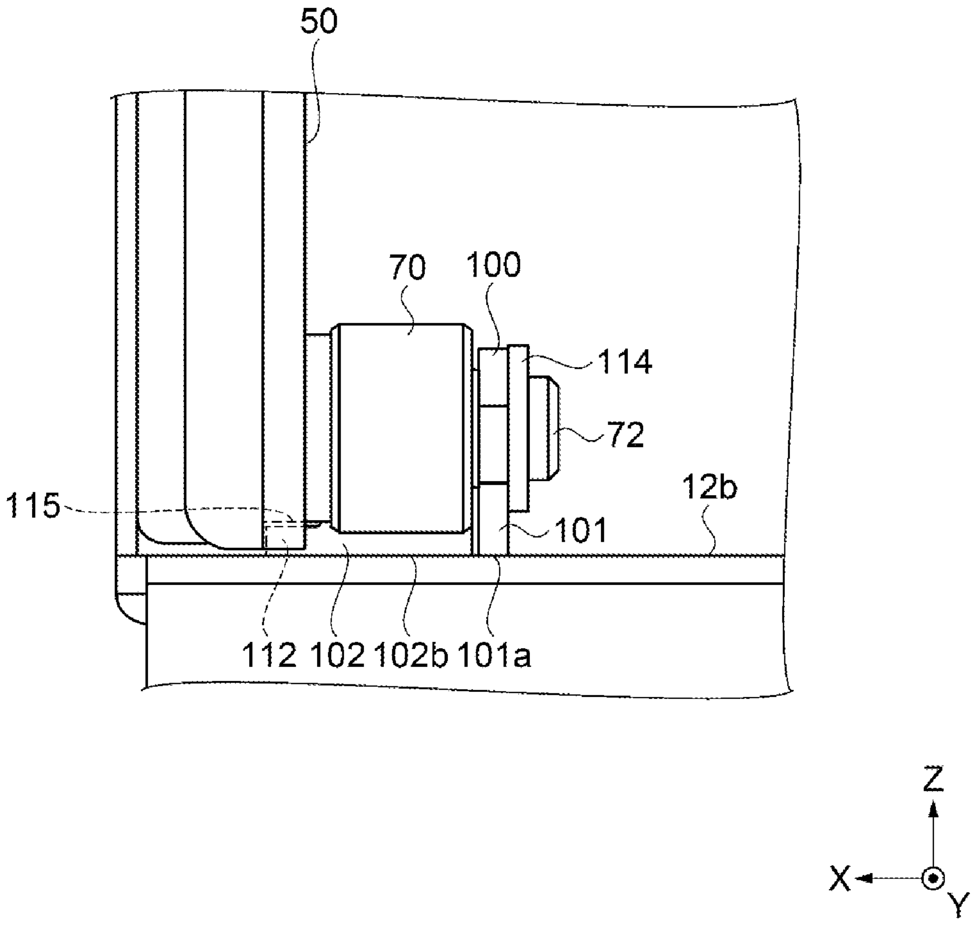
FIG. 7B is a front view illustrating an example in which the supporting member is attached in the second posture.

As illustrated in FIGS. 7A and 7B, in the second posture, the first surface 101*a* of the first portion 101 of the supporting member 100 and the second surface 102*b* of the second portion 102 serve as the bottom surface portion of the supporting member 100, and are disposed on the inner wall 12*b* (bottom plate) of the cassette accommodation unit 12 that is along the X-axis. At this time, the first portion 101 is disposed at the −X direction of the supporting member 100. In addition, the first portion 101 is disposed along the Z-axis. Furthermore, the protruding portion 112 is fitted into a notch portion 115 provided at a predetermined position between the inner wall 12*b* and the rail member 50. The notch portion 115 has a substantially rectangular shape, and engages with the protruding portion 112. This configuration makes it possible to prevent the supporting member 100 from being attached at a wrong location or being attached in a wrong posture. Furthermore, it is possible to prevent rotation at the time of attaching the supporting member 100. In addition, the attachable and detachable member 114 (for example, an E ring or a snap ring) is fitted at a tip portion of the shaft member 72 that protrudes from a through hole serving as the positioning portion 111. With this configuration, the supporting member 100 is positioned relative to the shaft member 72. As with the first posture, by detaching the member 114, it is possible to remove the supporting member 100 or the rotating member 70, which makes it possible to easily perform maintenance or replacement of the supporting member 100 or the rotating member 70.

In this manner, a both-side supporting structure B configured to support both ends of the shaft member 72 is formed.

When the supporting member 100 is in the second posture and, for example, when the paper-feed cassette 14 is pulled out from the cassette accommodation unit 12, a load in the −Z direction acts from the top portion of the rotating member 70 through the shaft member 72. In this case, the first surface 101*a* of the first portion 101 of the supporting member 100 and the second surface 102*b* of the second portion 102 are brought into contact with the inner wall 12*b*, and stress is transferred. This alleviates the stress acting on the supporting member 100, and it is possible to secure the strength of supporting the shaft member 72. That is, when a load acts in the −Z direction on the shaft member 72, the supporting member 100 supports the shaft member 72, and at the same time, the first portion 101 (first surface 101*a*) and the second portion 102 (second surface 102*b*) disposed at the −Z direction of the shaft member 72 are supported by the inner wall 12*b*. This makes it possible to maintain the state of support of the shaft member 72. Furthermore, the shaft member 72 is supported in a stable state. Thus, rotational movement of the rotating member 70 is not blocked, and it is possible to smoothly pull out the paper-feed cassette 14.

In addition, in the present embodiment, the height of attachment in the first posture is higher than that in the second posture. Specifically, in the supporting member 100, the length dimension D2 is longer than the length dimension D1. Thus, the length dimension between the inner wall 12*b* and the shaft center of the shaft member 72 in the first posture is longer than the length dimension between the inner wall 12*b* and the shaft center of the shaft member 72 in the second posture. Thus, it is possible to select the first posture or the second posture on an as-necessary basis depending on the layout of attachment of the supporting member 100 or specifications (for example, a difference in the height position of the bottom plate 12*b* or a structure in which the bottom plate 12*b* is not provided) concerning a paper-feed cassette portion. For example, the present embodiment enables the posture of the supporting member 100 to change for each of a plurality of paper-feed cassettes 14 depending on the layout of the cassette accommodation unit 12 in which the plurality of paper-feed cassettes 14 are accommodated. Furthermore, as one supporting member 100 or a plurality of supporting members having a shape common to each other are provided, it is possible to change attachment postures so as to correspond to different specifications of various types of paper-feed cassette portions. This makes it possible to achieve parts commonality concerning the supporting member 100, which makes it possible to reduce the cost.

Next, description will be made of another example in which the supporting member 100 is attached in the second posture.

Figure 8A:
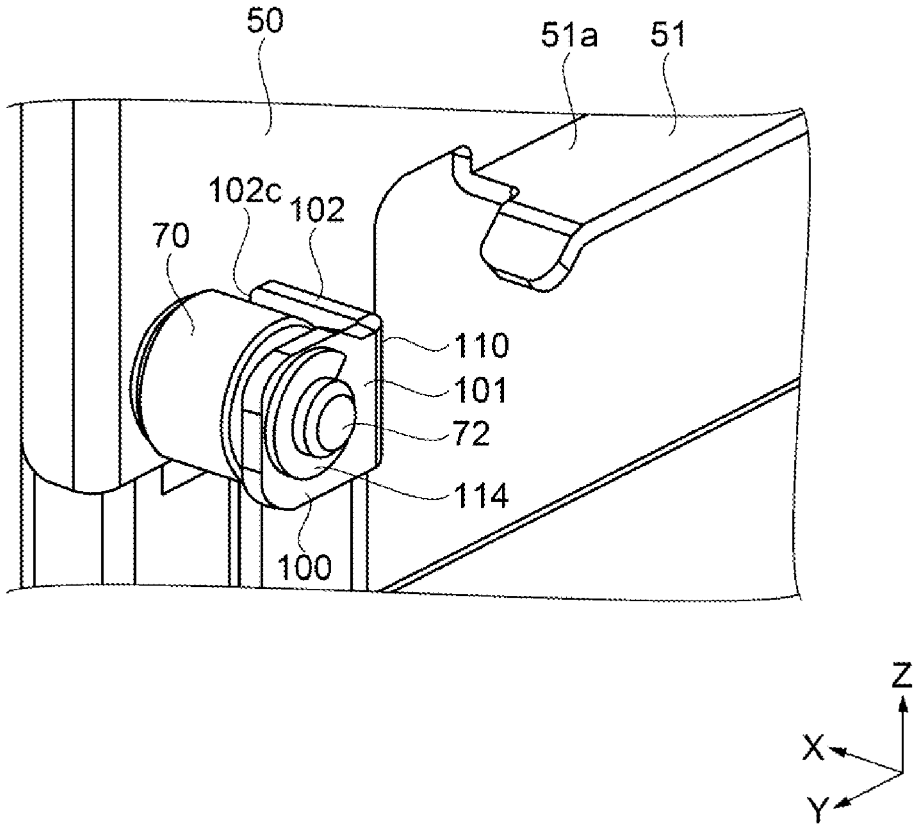
FIG. 8A is a perspective view illustrating another example in which the supporting member is attached in the second posture.
Figure 8B:
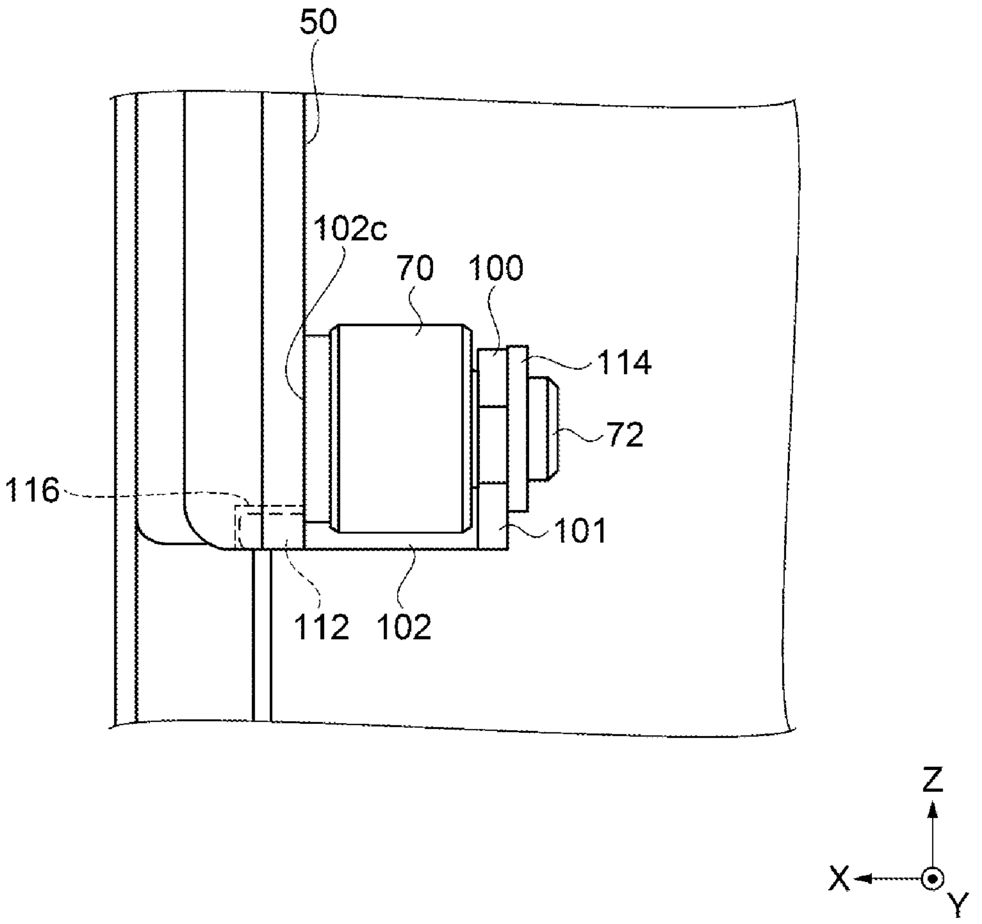
FIG. 8B is a front view illustrating another example in which the supporting member is attached in the second posture.

In the example illustrated in FIGS. 8A and 8B, the second posture is configured such that a third surface 102*c* (another side surface in FIG. 5A) of the second portion 102 receives a load. Specifically, the third surface 102*c* of the second portion 102 is disposed so as to be brought into contact with the rail member 50. The third surface 102*c* of the second portion 102 is a surface parallel to the flat surface of the first portion 101. At this time, the first portion 101 is disposed at the −X direction of the supporting member 100. In addition, the first portion 101 is disposed along the Z-axis. Furthermore, the protruding portion 112 is inserted into a notch portion 116 provided at a predetermined position of the rail member 50. The notch portion 116 has a substantially rectangular shape, and engages with the protruding portion 112. This configuration makes it possible to prevent the supporting member 100 from being attached at a wrong location or being attached in a wrong posture. Note that it may be possible to employ a configuration in which the notch portion 116 is not provided, a through-hole or a recessed portion is provided, and the protruding portion 112 is caused to engage with the through-hole or the recessed portion. This configuration makes it possible to prevent rotation at the time of attaching the supporting member 100. Furthermore, it is possible to prevent the supporting member 100 from rotating after attachment.

In addition, the attachable and detachable member 114 (for example, an E ring or a snap ring) is fitted at a tip portion of the shaft member 72 that is inserted into the positioning portion 111.

With this configuration, it is possible to form a both-side supporting structure C configured to support both ends of the shaft member 72.

In a case of the second posture given in the present example, for example, when the paper-feed cassette 14 is pulled out from the cassette accommodation unit 12, a load in the −Z direction acts from the top portion of the rotating member 70 through the shaft member 72. In this case, the third surface 102*c* of the second portion 102 of the supporting member 100 is brought into contact with the rail member 50, and stress is transferred. This alleviates the stress acting on the supporting member 100, and it is possible to secure the strength of supporting the shaft member 72. That is, when a load acts in the −Z direction on the shaft member 72, the supporting member 100 supports the shaft member 72, and at the same time, the second portion 102 (third surface 102*c*) is supported by the rail member 50. This makes it possible to maintain the state of support of the shaft member 72. Furthermore, the shaft member 72 is supported in a stable state. Thus, rotational movement of the rotating member 70 is not blocked, and it is possible to smoothly pull out the paper-feed cassette 14.

In this manner, with the present embodiment, by using the supporting member 100 having a simplified configuration in which a small metal sheet is bent, it is possible to form a both-side supporting structure of the shaft member 72. With this configuration, when a load acts on the shaft member 72 at the time of pulling out the paper-feed cassette 14, the supporting member 100 is supported by the inner wall 12*b* or the rail member 50, and the stress is alleviated. This makes it possible to suppress deformation or the like of the shaft member 72.

In addition, there is no need to increase the rotating member 70 or the shaft member 72 to deal with the load. Furthermore, there is no need to add any additional metal sheet or the like to reinforce the rotating member 70 or the shaft member 72. Thus, it is possible to reduce the size of the rotating member 70 or the shaft member 72. This makes it possible to reduce the size of the paper feed device 10 and the size of the image forming device 1. In other words, it is possible to suppress an increase in the size of the paper feed device 10 and the size of the image forming device 1.

Furthermore, this makes it possible to attach the supporting member 100 to the cassette accommodation unit 12 without using a fixing member such as a screw, and to form a both-side supporting structure of the shaft member 72. This eliminates the need, for example, of providing a space for disposing a screw or a space for handling a screwdriver used to fix a screw, which makes it possible to reduce the size of the cassette accommodation unit 12.

Furthermore, the supporting member 100 is configured so as to be able to change the attachment posture relative to the rail member 50 or the inner wall 12*a*, 12*b* of the cassette accommodation unit 12. Thus, even when the attachment space differs, it is possible to easily perform attachment by changing the attachment posture of the supporting member 100. That is, it is possible to achieve parts commonality concerning the supporting member 100, which makes it possible to reduce the cost.

Note that the supporting structure of the shaft member 72 using the supporting member 100 according to the present embodiment may be provided at positions corresponding to both end portions of each of the paper-feed cassettes 14 accommodated in the cassette accommodation unit 12 or may be provided only at either end portion thereof.

Furthermore, the attachment posture of the supporting member 100 is not limited to the attachment postures described above. For example, the supporting member 100 may be attached such that a second surface 101*b* (FIG. 5A) of the first portion 101 of the supporting member 100 is brought into contact with the inner wall 12*b* (bottom plate). With this configuration, it is possible to obtain an effect similar to that described above.

What is claimed is:

1. A paper feed device comprising:

a paper-feed cassette configured to be removably inserted to a cassette accommodation unit;

a rail member provided at an inner wall of the cassette accommodation unit;

an engagement surface provided at the paper-feed cassette and configured to movably engage with the rail member;

a rotating roller configured to be brought into contact with the engagement surface and rotate in association with insertion and removal of the paper-feed cassette;

a shaft member configured to pivotally support the rotating roller and have one end fixed to the rail member or an inner wall of the cassette accommodation unit; and a supporting member configured to support another end of the shaft member to make the shaft member have a both-side supporting structure, wherein the supporting member is shaped so as to change an attachment posture relative to the rail member or the inner wall of the cassette accommodation unit, the supporting member is obtained by bending a metal sheet, and has a first portion at one end with respect to the bending, and a second portion at another end, the first portion includes a positioning portion, and a position, in an axial direction, of the positioning portion is restricted relative to the shaft member.

2. The paper feed device according to claim 1, wherein the supporting member is configured to switch between a first posture in which the supporting member is positioned by the shaft member and a second posture obtained by rotating the supporting member with a shaft center of the shaft member being a center.

3. The paper feed device according to claim 2, wherein the first posture and the second posture differ in a distance from a position of the shaft center of the shaft member to a bottom surface portion of the supporting member.

4. The paper feed device according to claim 1, wherein the first posture is configured such that a flat surface of the second portion serves as a bottom surface portion of the supporting member to receive a load, and the second posture is a posture rotated relative to the first posture in a first direction by a predetermined angle, and is configured such that a side surface of the first portion and a side surface of the second portion serve as a bottom surface portion of the supporting member to receive a load.

5. The paper feed device according to claim 4, wherein the second posture is configured such that another side surface of the second portion receives a load.

6. The paper feed device according to claim 1, wherein a protruding portion is provided at a side portion of the second portion that is at an opposed side from the first portion.

7. The paper feed device according to claim 1, wherein the supporting member is positioned by a member attachable to and detachable from the shaft member.

8. An image forming device comprising:

the paper feed device according to claim 1; and an image forming unit configured to form an image on a sheet transported from the paper feed device.

9. An image forming device comprising:

a paper-feed cassette configured to be removably inserted to a cassette accommodation unit;

a rail member provided at an inner wall of the cassette accommodation unit;

an engagement surface provided at the paper-feed cassette and configured to movably engage with the rail member;

a rotating roller configured to be brought into contact with the engagement surface and rotate in association with insertion and removal of the paper-feed cassette;

a shaft member configured to pivotally support the rotating roller and have one end fixed to the rail member or an inner wall of the cassette accommodation unit;

a supporting member configured to support another end of the shaft member to make the shaft member have a both-side supporting structure; and an image forming unit configured to form an image on a sheet transported from the paper-feed cassette, wherein the paper-feed cassette includes a first paper-feed cassette and a second paper-feed cassette, the rotating roller includes a first rotating roller corresponding to the first paper-feed cassette, and a second rotating roller corresponding to the second paper-feed cassette, the shaft member includes a first shaft member corresponding to the first rotating roller, and a second shaft member corresponding to the second rotating roller, the supporting member includes a first supporting member corresponding to the first shaft member, and a second supporting member having a shape equal to the first supporting member and corresponding to the second shaft member, the first supporting member is attached, in a first posture, to the first shaft member, and the second supporting member is attached in a second posture rotated relative to the first posture with a shaft center of the second shaft member being a center thereof, the first and second supporting members are obtained by bending a metal sheet, and have a first portion at one end with respect to the bending, and a second portion at another end, the first portion includes a positioning portion, and a position, in an axial direction, of the positioning portion is restricted relative to the shaft member.

10. A paper feed device comprising:

a paper-feed cassette configured to be removably inserted to a cassette accommodation unit;

a rail member provided at an inner wall of the cassette accommodation unit;

an engagement surface provided at the paper-feed cassette and configured to movably engage with the rail member;

a rotating roller configured to be brought into contact with the engagement surface and rotate in association with insertion and removal of the paper-feed cassette;

a shaft member configured to pivotally support the rotating roller and have one end fixed to the rail member or an inner wall of the cassette accommodation unit; and a supporting member configured to support another end of the shaft member to make the shaft member have a both-side supporting structure, wherein the supporting member is shaped so as to change an attachment posture relative to the rail member or the inner wall of the cassette accommodation unit, the supporting member is configured to switch between a first posture in which the supporting member is positioned by the shaft member and a second posture obtained by rotating the supporting member with a shaft center of the shaft member being a center, and the first posture and the second posture differ in a distance from a position of the shaft center of the shaft member to a bottom surface portion of the supporting member.

* * * * *